July 8, 1969     R. T. PFAFFENBERGER ET AL     3,453,717
ROLL WELDED STRUCTURE AND PROCESS
Filed Jan. 12, 1966
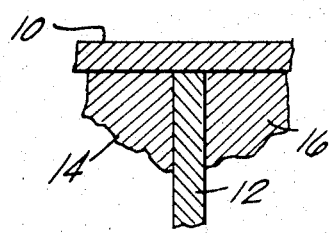
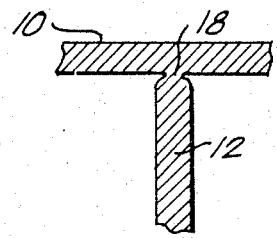
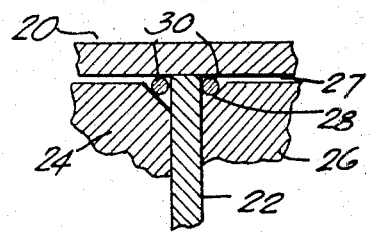
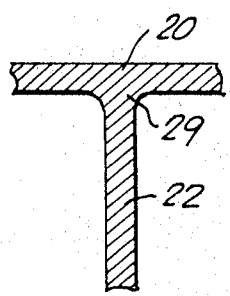
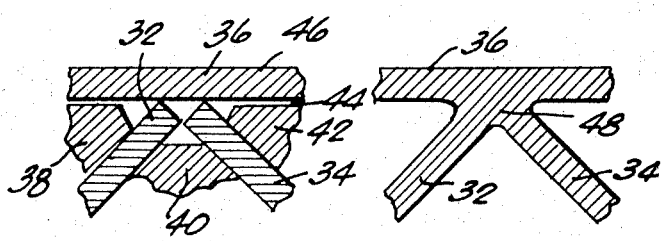
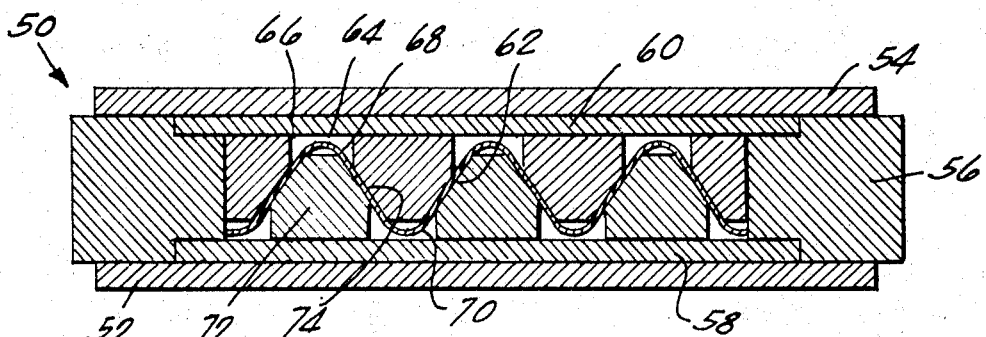
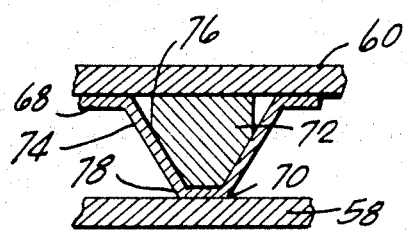
INVENTOR.
RICHARD T. PFAFFENBERGER
BY LEONARD R. VAN HORIK
Robert O. Richardson
ATTORNEY.

United States Patent Office 3,453,717
Patented July 8, 1969

3,453,717
ROLL WELDED STRUCTURE AND PROCESS
Richard T. Pfaffenberger, 12111 Reagan, Los Alamitos, Calif. 90720, and Leonard R. Van Horik, 4224 Blackthorne Ave., Long Beach, Calif. 90808
Filed Jan. 12, 1966, Ser. No. 522,015
Int. Cl. B23k 31/02
U.S. Cl. 29—423　　　　　　　　　　　　　8 Claims

ABSTRACT OF THE DISCLOSURE

An improved method of making roll-welded structures of heat resistant material and having a high strength-to-weight ratio, wherein the filler material is of less thickness than the width of reinforcing members of a reinforced panel and chamfered to provide a fillet between the reinforcing members and the panel to which they are autogenously welded.

---

This invention relates to improvements in roll-welded structure and the process for making the same. More specifically, this invention relates to an improved method of making roll-welded structures of heat resistant material and having a high strength to weight ratio.

One solution to the problem of developing light weight, high strength structures is disclosed in a Patent Number 3,044,160 issuing to Robert I. Jaffee on July 17, 1962, for "Method of Producing Ribbed Metal Sandwich Structures." Therein is disclosed a new method of joining face materials to ribbed cores by roll bonding. When one facing material is used, it is reinforced by the core and when two opposing face materials are used, the core reinforces and maintains the materials in spaced relationship. The core or ribs are joined to the face materials by roll bonding, a method which provides a continuous solid state bond between the facing materials and the ribbed cores at a substantial reduction in cost. The process is basically simple. Alternate ribs and filler material are hot rolled between two sheets of the cover material. The cover and ribs become integrally bonded and the filler material is then removed by mechanical or chemical means. The ribs and cover may be of such corrosion-resistant metals as stainless steel, aluminum, titanium and titanium alloy, nickel and nickel alloys, tantalum, beryllium, molybdenum and columbium. The spacer material may be selected from other readily dissolved metals such as copper, mild steel or others. Stiffened skin structures and individual sections of reinforcement elements, such as I-beams, L-beams, C-beams and H-beams, for example, may be fabricated. Truss core, rectangular cell and hexagonal cell honeycomb sandwich structures may be made in addition to the prior vertical rib structures. Tapered configurations, radial sandwich and waffle structures are other modifications. The roll-welding process utilizes heat and pressure to produce a true diffusion bond or autogenous weld between the core and the faces of the sandwich. Thus, the inner faces are diffused together and the resulting bond, itself, has the properties and the strength of the base metal. The more detailed description of the roll-welding process is in co-pending application of Robert I. Jaffee, Ser. No. 410,971 filed Nov. 13, 1964 and entitled "Sandwich Structures and Method."

In the practice of the roll-weld process as known and understood prior to this invention, there has been on occasion some inferior welded joints between the ribs and their abutting inner faces. It has been found that these faulty joints are caused by the tendency of the filler material in its fluid state under heat and pressure to penetrate between the abutting surfaces of the cover sheet and the ribs. An even greater difficulty in achieving a satisfactory weld occurs when a corrugated rib structure is positioned between two outer covers because the rounded portion of the corrugated material makes a point contact with the cover, making a flow of the filler material between the corrugation and the cover relatively easy.

In accordance with the principles of the present invention, the filler bars are formed so as to have a configuration and relationship with the ribs and cover plates different from that used previously. It has been found that by leaving a small void area along the line of juncture between the cover plate and the ribs, in which area there is no filler material, there is no flow of filler material into the line of juncture so as to cause a poor joint. Further, a small amount of the material of the cover plates and ribs, such as a wire, placed in this void area will produce an excellent fillet joint. This also occurs when the ribs are made slightly longer than the thickness of the filler material so that the cover plate is slightly raised from it. This technique, as applied to the use of corrugated material between two cover plates, calls for a small gap between the filler bar and the crown or valley of the corrugation. Thus, when the bonding is completed, instead of point contact between the crown or valley of the corrugation and the cover plate, a sharp corner has been formed leaving a flat surface of the corrugated material autogenously welded to the cover plate.

It is therefore an object of the present invention to provide for an improved roll-welded structure.

A further object is the provision of an improved roll-weld technique for producing better welds between ribs and cover plates in the fabrication of reinforced high strength to weight panel structures.

Another object is the provision of an improved roll-welded structure in which the cost of machining filler bars is reduced because the acuteness of the critical dimensions of the filler bars has been reduced.

Other objects will become more apparent as a description of this invention proceeds, now having reference to the drawings, in which:

FIGURE 1 is a cross-sectional view showing the relationship of the filler material, rib and cover plate previously used before the roll-welding has occurred, FIGURE 2 shows the joint after the process has been completed, FIGURE 3 shows the new relationship of the cover plate, ribs and filler material before the roll-welding process, FIGURE 4 shows the results after the process is completed, FIGURES 5 and 6 show an alternate form of structure before and after the roll-weld bonding process is completed, and FIGURES 7 and 8 show a further modification of structure before and after the roll-weld bonding process.

Reference is now made to FIGURE 1 wherein is shown a cover plate 10, a vertical rib 12 to be bonded thereto, and filler material 14, 16 on both sides of the rib 12. In accordance with the roll-welding process the ribs and filler material are positioned in a roll-weld pack such as that shown in FIG. 7. The upper surface of the filler material 14, 16 and ribs 12 are substantially flush and smooth, permitting the face plate 10 to lie in close contact thereover. After this has been done, a top cover plate is positioned over the face plate and the entire package is welded together, after which the inner air is evacuated to reduce pressure therein and to reduce the possibility of contamination. After this, the pack is hot-rolled in the same manner as if it were a single metal plate to the desired reduction in thickness. A 60% reduction is typical of this practice. It is during the hot-rolling that welding is accomplished. The temperature most desirable for bonding is approximately 50° F. to 100° F. below the critical temperature of the parts being welded. This critical temperature may be the beta-transis temperature, or the melting point of either alloy in the pack, whichever is lower. For example, titanium alloy 6AL4V changes from an alpha-beta-phase crystalline structure to a beta-phase crystalline structure at 1800° F. The ideal rolling temperature is therefore around 1750° F. The same line of reasoning is applicable to other metallic crystalline structures. The pressures required are simply those necessary to achieve the proper reduction when the pack is at the proper temperature.

Referring now to the finished product in FIGURE 2, it is apparent that during the process, the rib 12 has not made a complete joint with the face plate 10 and that the thickness of the welded joint 18 is less than the thickness of the rib 12. This may possibly be due to insufficient contact between the end of rib 12 and face plate 10 to permit flow of the filler material therebetween during the hot-rolling operation.

As shown in the cross-sectional view in the FIGURE 3, face plate 20 is in intimate contact with the upper end of rib 22, but not with filler material 24, 26 which is reduced in thickness to provide an underfill space 27. This space 27, between the face plate 20 and the filler material 24, 26 is on the order of from .010 inches to .040 inches. Previously, the dimensional accuracy of the filler material, as a permissive tolerance in the machining of the filler material, called for no less than from .003 to .007 inch underfill. In addition to the advantages, as set forth, the underfill provided in the present invention will also substantially decrease the cost of fabrication inasmuch as the dimensional accuracy in the fabrication of the filler material is now less critical. Also, by champhering the corners of the filler material adjacent the joint area, the ribs 22 which are under greater pressure than the filler material 24, 26 will flow into this area 28 causing a fillet joint 29 as shown in the final configuration in FIGURE 4. This relieves the stress concentrations at the joint area. The filler bar champher may be either straight or curved, and should provide for an unsupported standing rib height of from 1 to 5 times the thickness of the rib. A larger fillet may be provided by the insertion of wires 30 within the chamfer. These wires, of course, are of the same material as the rib 22 and face plate 20 so that joint 29 becomes a homogeneous autogenous weld.

FIGURES 5 and 6 are similar to FIGURES 3 and 4 in that they show the ribs and filler material in their relationship with the cover plate before welding and after the roll-weld process has been completed. In this case, ribs 32, 34 are not at right angles to face plate 36 but terminate in abutment therewith at substantially the same point. Here again, the filler material 38, 40 and 42 are formed so as to leave an underfill 44 between the material and face plate 36 and to provide undercuts 46 in the area of contact between the ribs 32, 34 and cover plate 36. As can be seen from FIGURE 6 an excellent joint 48 has been formed, again with fillets to relieve stress concentrations.

Referring now to FIGURE 7 there is shown in cross-section a roll-weld pack 50 consisting of a bottom cover plate 52, top cover plate 54 and surrounding yoke 56. These are of a material other than that of the parts to be welded together. Within the pack is positioned a lower face plate 58 and upper face plate 60. Sandwiched between the two plates is a corrugated reinforcing strip 62 of the same material as the two face plates 58, 60 and to which the face plates are to be bonded. Instead of the former procedure of completely filling the void spaces between the corrugation sections with a filler material, in accordance with the present invention the areas 64, 66 on both sides of the reinforcing strip 62 at the crown 68 and valleys 70 of the corrugations are not filled, although filler material 72 abuts both sides of the web section 74. When the pack is subjected to the heat and pressure in the rolled-weld process the corrugation insert 62 assumes the shape as shown in FIG. 8. Here the crown 68 and the valley 70 becomes flattened to form sharp corners 76, 78 with the web 74. This presents a much larger surface of bonding to the face plates 58 and 60. The apex of the valley 70 and the crown 68 were initially in contact with the face plates 58, 60 and since the filler material 72 provides for void spaces 64, 66 within this area, the crown 68 and valley 70 becomes flattened against the inner surface of the face plates before the filler material can flow thereto under the heat and pressure of the roll-weld process.

Having thus described the invention, it is believed that other modifications and variations will readily become apparent to one skilled in the art, and that such deviations from the described embodiment are to be considered as part of the invention as defined by the appended claims.

What is claimed is:

1. A method of providing for a high strength-to-weight part comprising at least one face plate to which reinforcement members are to be added by roll-weld bonding, said method comprising:
    placing said reinforcement members in abuttment against the inner surface of said face plate in spaced-apart contacting relationhip,
    placing filler material between said reinforcement members with a space provided between said face plate and said filler material, and
    hot rolling said plate, members and material under suitable heat and pressure to thereby cause autogenous welding of said plate and members.

2. The method of claim 1 wherein said space is from .010 inch to .040 inch between said face plate and said filler material.

3. The method of claim 1 wherein said filler material is chamfered in the area of the joint between said face plate and said reinforcement member.

4. The method of claim 3 wherein additional material is placed in the chamfer to provide for a fillet joint.

5. The method of claim 1 wherein said reinforcement member is a corrugated sheet wherein its crowns abut said face sheet and filler material is undercut adjacent thereto.

6. The method of claim 1 wherein a pair of opposing face plates are used and wherein said reinforcement member is a corrugated sheet, whereby its crowns and valleys abut the inner surfaces of said sheets and said filler material is undercut adjacent thereto.

7. The method of claim 1 wherein said face plate and member is of a different material than that of said filler material.

8. The method of claim 3 wherein the unsupported standing height of said reinforcement member is from 1 to 5 times the thickness of said member.

References Cited

UNITED STATES PATENTS

| | | | |
|---|---|---|---|
| 2,851,770 | 9/1958 | Fromson | 29—423 |
| 3,044,160 | 7/1962 | Jaffee | 29—423 |
| 3,061,713 | 10/1962 | Eggert | 219—107 |
| 3,071,216 | 1/1963 | Jones et al. | 29—455 X |
| 3,321,826 | 5/1967 | Lowy | 29—455 X |

JOHN F. CAMPBELL, *Primary Examiner.*

J. L. CLINE, *Assistant Examiner.*

U.S. Cl. X.R.

29—497.5

PO-1050
(5/69)

UNITED STATES PATENT OFFICE
CERTIFICATE OF CORRECTION

Patent No. 3,453,717      Dated 8 July 1969

Inventor(s) Richard T. Pfaffenberger and Leonard R. VanHorik

It is certified that error appears in the above-identified patent and that said Letters Patent are hereby corrected as shown below:

In Column 1, line 4, after the numerals 90808, insert --assignors, by mesne assignments, to McDonnell Douglas Corporation, Santa Monica, California, a corporation of Maryland--.

SIGNED AND
SEALED
FEB 1 7 1970

(SEAL)
Attest:

Edward M. Fletcher, Jr.
Attesting Officer

WILLIAM E. SCHUYLER, JR.
Commissioner of Patents